Feb. 24, 1948. D. E. DAILEY Re. 22,976

TWO TEMPERATURE REFRIGERATOR

Original Filed Dec. 28, 1943 2 Sheets-Sheet 1

Inventor:—
Donald E. Dailey
by his Attorneys
Howson + Howson

Feb. 24, 1948. D. E. DAILEY Re. 22,976

TWO TEMPERATURE REFRIGERATOR

Original Filed Dec. 28, 1943 2 Sheets-Sheet 2

Inventor:—
Donald E Dailey
by his Attorneys
Howson + Howson

Reissued Feb. 24, 1948

Re. 22,976

UNITED STATES PATENT OFFICE 22,976

TWO-TEMPERATURE REFRIGERATOR

Donald E. Dailey, Bryn Mawr, Pa., assignor, by mesne assignments, to Philco Corporation, Philadelphia, Pa., a corporation of Pennsylvania Original No. 2,430,456, dated November 11, 1947, Serial No. 515,950, December 28, 1943. Application for reissue December 4, 1947, Serial No. 789,751

18 Claims. (Cl. 62—116)

The present invention relates to refrigerators, and more particularly to domestic refrigerators of the type having a plurality of compartments of which one is to be maintained at a temperature level differing from that of another.

In the modern domestic refrigerator it is desirable to provide a sharp-freezing chamber for storage of frozen foods, but the provision of such a chamber has given rise to numerous problems, both from the standpoint of construction and from the standpoint of efficient operation. In one of several prior types of multiple-temperature refrigerator box, for example, a sharp-freezing chamber was established in the upper portion of the main compartment of the box. This type of construction has been found objectionable, not only because in this location the sharp-freezing chamber takes up an appreciable percentage of the cubic footage which otherwise would be available in the main compartment for the storage of ordinary foodstuff, but also because the mounting of the sharp-freezing chamber in the upper portion of the main compartment impairs the operative effectiveness of the box, there being three main reasons for such impairment, namely: first, a tendency for the main food storage area to "freeze-up" due to the fact that the higher-density cold air flows downwardly and promotes a circulatory air flow tending to "draw down" the temperature in that area to an undesirably low level; second, the moisture in the said food storage area (which should be maintained at a high value for the best preservation of foodstuffs) condenses out upon the sharp freezer in the form of frost, as the air circulates; and third, the substantial spillage of the cold air from the freezing chamber every time the door thereof is opened.

In another type of multiple-temperature refrigerator box construction, the sharp-freezing chamber is located in the bottom of the main compartment of the box. While this type of construction tends to avoid "freezing-up" of the main food storage area and reduces dehumidification of the air therein, it still has the disadvantages of cold air spillage and of cutting down the space available for storage of ordinary foodstuff.

It is, therefore, a primary object of the present invention to provide a multiple-temperature refrigerator constructed so as to overcome the disadvantages of the various prior types of box, and to this end the invention contemplates a novel box structure that conserves the space available in the main compartment for the storage of ordinary foods, avoids "freezing-up" of said compartment, and effectively prevents both spillage of cold air from the sharp-freezing chamber and dehumidification of the air in the main food storage compartment.

More specifically, an object of the invention is to provide a domestic refrigerator including a sharp-freezing compartment, wherein the said compartment takes none of the space normally available for storage of ordinary foods in the main food storage area, and wherein further the compartment may be maintained at a comparatively low temperature without "freezing-up" the said main food storage area and without appreciable "frosting" of the compartment surfaces.

Another object of the invention is to provide a domestic multiple-temperature refrigerator having a low-temperature sharp-freezing compartment arranged in frost-minimizing location and so disposed that a single door may serve as a common closure for the various compartments, the arrangement providing also for convenient location of the ice trays in non-obstructing relation to the main food storage compartment, and for access to the low-temperature compartment without interference with the main food storage area.

The invention is further characterized by the provision of a multiple-temperature refrigerator of the type including a low-temperature sharp-freezing compartment for the storage of frozen food, wherein the said compartment, located below the main food storage area, is generally in the form of a well having top access so as to prevent spillage of cold air from the compartment when opened.

Other objects and characteristic features of the invention will appear to those skilled in the art from the following detail description and from the accompanying drawings, in which.

Figure 1:
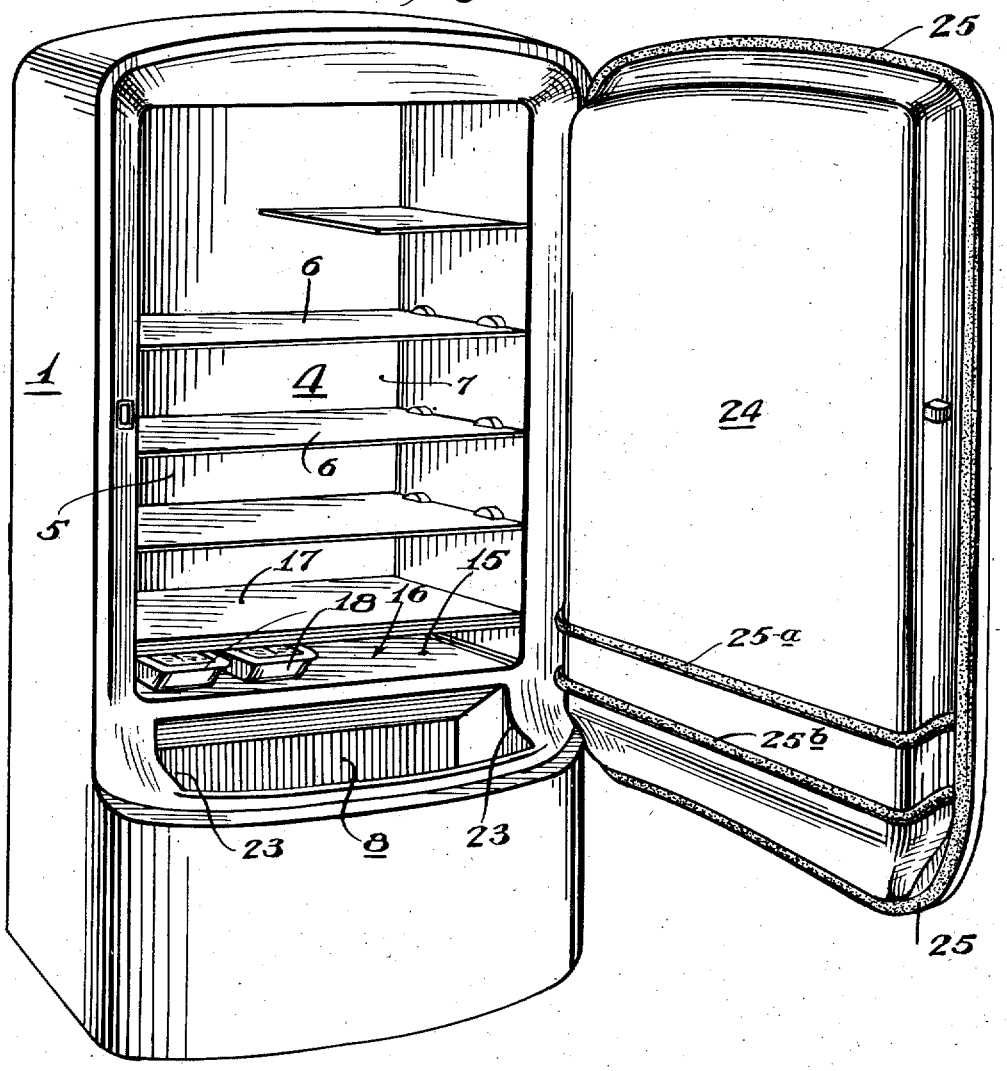
Figure 1 is a perspective view illustrating a refrigerator constructed in accordance with the invention.

With reference to the drawings, the refrigerator cabinet therein illustrated and designated generally by the reference numeral 1, contains a main compartment 4 which occupies the upper and major portion 2 of the cabinet, and a frozen food compartment 8 which occupies a position below the compartment 4 and at the front of the lower and minor portion 3 of the cabinet. The compartment 4 is characterized by its relatively large clear area available for storage of foodstuffs, and is provided with shelves 6 in accordance with the usual practice. The cabinet comprises an inner metallic liner 7 and in the present instance this liner embraces both of the compartments 4 and 8.

The frozen food compartment 8 is of the sharp-freezing type and accordingly is to be maintained at relatively low temperature, preferably in the vicinity of 0° Fahrenheit. For that purpose, evaporator coils 10 of a primary refrigerating system, are conveniently associated with the compartment 8, in the manner for example illustrated in Figure 2, said system including the usual motor-compressor unit 11 and condenser 12 which are suitably mounted in a chamber 13 at the back of the lower portion 3 of the cabinet.

Figure 2:
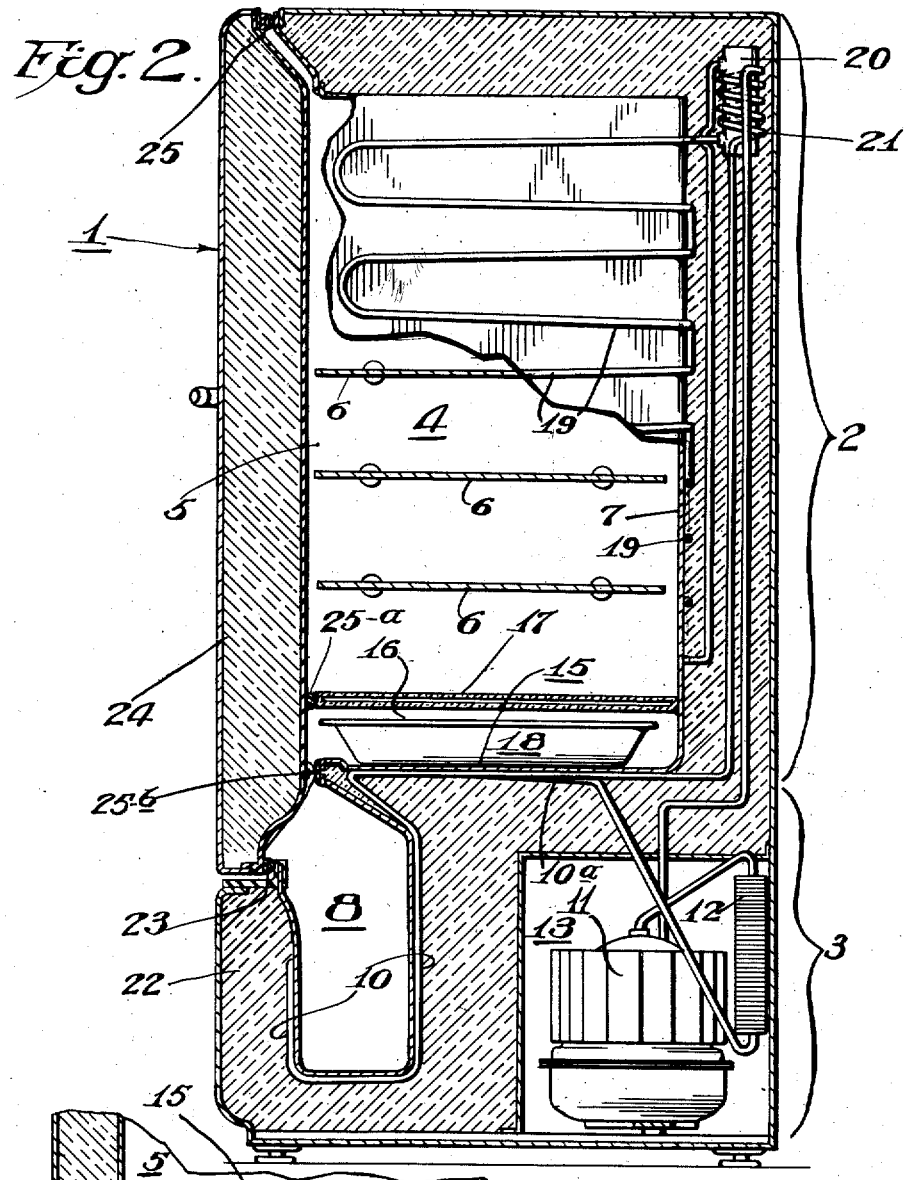
Figure 2 is a vertical sectional view of the refrigerator.

As indicated in Figure 2, a section 10*a* of the evaporator coil is associated with the lower portion of the main compartment 4 thereby making provision for a conveniently located ice cube freezing area 16 at the bottom of the said main compartment. Normally, the area 16 will be maintained at temperatures higher than that of the sharp-freezing compartment 8 but lower than the temperature in the main food storage area 5, or in other words, at temperatures ranging approximately between 10° and 15° Fahrenheit, and preferably the area 16 is separated from said main food storage area by partition means, such as a shelf 17 of glass or other suitable material, said shelf being positioned so as to afford space for accommodation of ice trays 18 of conventional type.

The main storage area 5 is preferably maintained at temperatures approximating 40° Fahrenheit, and refrigeration of this area may be effected conveniently by cooling the walls defining such area in the manner well known in the art. For that purpose, evaporator tubings 19 of a closed secondary refrigerating system, may be bonded to the inner liner 7, said secondary system comprising a condensing portion 20 in heat exchange relationship with an evaporator portion 21 of the primary refrigerating system.

In accordance with the present invention, the sharp-freezing compartment 8, intended for the storage of frozen food, is given the form of a true well, being enclosed at sides and bottom by insulated walls 22 and having a top opening 23, and this opening faces upwardly and toward the front of the cabinet so that the door 24 which forms a closure for the compartment 4 may constitute also an isolating closure for the compartment 8. A suitable gasket strip 25 is provided on the door 24 to afford an effective seal for the refrigerated space in the interior of the cabinet when the door is closed, and by providing corresponding strips 25*a* and 25*b* for engagement with the forward edges of the partition 17 and of the bottom wall 15 of the compartment 16, the door may function also to seal the individual access openings of the several compartments or refrigerated areas 5, 8 and 16.

The forward location and arrangement of the access opening 23 of the sharp-freezing compartment 8 also makes possible the arrangement of the compartment 16 and of the ice trays 18 immediately above the said opening while at the same time maintaining a high degree of accessibility to the sharp-freezing compartment. Furthermore, the aforedescribed device for isolating the several compartments or refrigerated areas from each other, aids in preventing formation of frost in the sharp-freezing compartment 8 arising from the passage of moisture laden air by convection between the said compartments and areas. Since, however, moisture is conducted largely by convection currents (the warm moisture-laden air moving upwardly), it will be apparent that even in the absence of the said isolating means little or none of the moisture which is present and desirable in the food storage area 5, will find its way into the lower sharp-freezing compartment 8. Moreover, the stratification of the air in the sharp-freezing compartment 8, together with the particular location of the opening 23, effectively prevents the spillage of cold air, and the consequent inrush of warm moist air, which has proven a major source of the ineffectiveness of prior multiple-temperature refrigerators.

Due also to the stratification of the air referred to above, and to the peculiar location of the sharp-freezing compartment 8 in relation to the other refrigerated areas of the refrigerator, it is possible to utilize relatively low temperatures within the said compartment without danger of appreciably lowering the temperature of the main food storage area.

Figure 3:
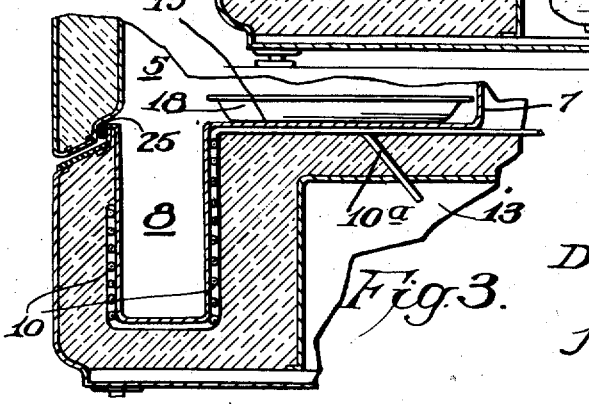
Figure 3 is a sectional detail view illustrating a modification within the scope of the invention.

Whereas the aforedescribed construction is desirable, it will be understood that because of the relative location of the main storage compartment 5 and the sharp-freezer compartment 8, and of the top access provided for the latter compartment, the shelf 17 and the forward part of the bottom wall 15 may be eliminated while still retaining many of the above recited advantages. Such an arrangement wherein the compartments 5 and 8 are in open communication is shown in Figure 3, and as set forth above, stratification of the air in the low temperature compartment effectively prevents the setting up of convection currents between the compartments and, therefore, the "freezing-up" and dehumidification of the main food storage area.

It is to be understood that whereas a closed secondary system has been shown and described herein as a preferred means for cooling the main food storage area 5, a second primary system of a type well known in the art may be employed for that purpose. It is to be understood also that the specific structural arrangements herein set forth may be modified within the scope of the claims without departing from the spirit of the invention.

I claim:

1. In a refrigerator of the character described, a cabinet having a main refrigerated compartment, a sharp-freezing compartment located below the main compartment, said sharp-freezing compartment being enclosed at the sides and bottom and having an access opening in the upper portion thereof, a door constituting a common closure for said compartments, and means cooperative with the door when the latter is closed for individually sealing said compartments.

2. In a refrigerator of the character described, a cabinet having a main refrigerated compartment, a sharp-freezing compartment located below the main compartment, said sharp-freezing compartment being enclosed at the sides and bottom and having an access opening in the upper portion thereof, a door constituting a common closure for said compartments, and gasket strips carried by the door and engageable with the exposed marginal edges of said compartments for sealing the latter.

3. In a refrigerator of the character described, a main refrigerated compartment, a sharp-freezing compartment located below the main compartment, said sharp-freezing compartment being enclosed at the sides and bottom and having an access opening in the upper portion thereof, a primary refrigerating system having evaporator coils in heat-absorbing relation with the sharp-freezing compartment, and a secondary system having evaporator coils in heat-absorbing relation with said main compartment.

4. In a refrigerator of the character described, a main refrigerated compartment, a sharp-freezing compartment located below the main compartment, said sharp-freezing compartment being enclosed at the sides and bottom and having an access opening in the upper portion thereof, a primary refrigerating system having evaporator coils in heat-absorbing relation with said sharp-freezing compartment and with the lower portion of said main compartment, and a secondary system having evaporator coils in heat-absorbing relation with said main compartment.

5. In a refrigerator of the character described, a main refrigerated compartment and a sharp-freezing compartment located below the main compartment, said sharp-freezing compartment being enclosed at the sides and bottom and having an access opening in the upper portion thereof, means for refrigerating said compartments including a refrigerating system having an evaporator means in heat-absorbing relation with said sharp-freezing compartment and with the lower portion of said main compartment, means forming a separate compartment in said lower portion of the main compartment, a door constituting a common closure for all of said compartments, and means operative when the door is closed for isolating said compartments from each other.

6. In a refrigerator of the character described, a cabinet having therein a main compartment forming a food storage area, a sharp-freezing compartment arranged below said main compartment, said sharp-freezing compartment being enclosed at the sides and bottom and having an access opening in the upper portion thereof, a primary refrigerating system having coils associated with said sharp-freezing compartment for cooling the same, a part of the said coils of the primary system being in heat-absorbing relation with the lower portion of said main compartment to provide an ice-freezing area, and a secondary system having coils arranged for cooling the said main food storage area.

7. In a refrigerator of the character described, a cabinet having therein a main compartment forming a food storage area, a sharp-freezing compartment arranged below said main compartment, said sharp-freezing compartment being enclosed at the sides and bottom and having an access opening in the upper portion thereof, a primary refrigerating system having coils associated with said sharp-freezing compartment for cooling the same, a part of the said coils of the primary system being in heat-absorbing relation with the lower portion of said main compartment to provide an ice-freezing area, a secondary system having coils arranged for cooling the said main food storage area, and a door mounted on the cabinet and constituting a common closure for said compartments.

8. In a refrigerator of the character described, a cabinet having therein a main compartment forming a food storage area, a sharp-freezing compartment arranged below said main compartment enclosed at sides and bottom and having an access opening in the upper portion thereof, a refrigerating system having coils associated with said sharp-freezing compartment for cooling the latter, said coils being also in heat-absorbing relation with the lower portion of said main compartment to afford therein an ice-freezing area, partition means for segregating said ice-freezing area from the said main food storage area, a door on said cabinet constituting a common closure for said compartments, and means operative when the door is closed for isolating the said ice-forming area from the main food storage area.

9. In a refrigerator of the character described, a cabinet having therein a main compartment forming a food storage area, a sharp-freezing compartment arranged below said main compartment enclosed at sides and bottom and having an access opening in the upper portion thereof, a refrigerating system having coils associated with said sharp-freezing compartment for cooling the latter, said coils being also in heat-absorbing relation with the lower portion of said main compartment to afford therein an ice-freezing area, partition means for segregating said ice-freezing area from the main food storage area, a door on said cabinet constituting a common closure for said compartments, and gasket means carried by the door and engageable with the exposed marginal edge of said partition for isolating the ice-forming area from said food storage area.

10. In a refrigerator of the character described, a cabinet having therein a main compartment forming a food storage area, a sharp-freezing compartment arranged below said main compartment enclosed at sides and bottom and having an access opening in the upper portion thereof, a refrigerating system having coils associated with said sharp-freezing compartment for cooling the latter, said coils being also in heat-absorbing relation with the lower portion of said main compartment to afford therein an ice-freezing area, partition means separating the ice-forming area from the said food storage area of said main compartment, partition means for separating the said ice-forming area from the sharp-freezing compartment, a door on said cabinet constituting a common closure for said compartments, and means on said door cooperative with the exposed edges of said partitions for isolating the said areas and the sharp-freezing compartment from each other.

11. In a refrigerator of the character described, a cabinet having therein a main compartment forming a food storage area, an inner metallic liner in said cabinet forming the walls of said compartment, a sharp-freezing compartment located below said main compartment, said sharp-freezing compartment being enclosed at the sides and bottom and having an access opening in the upper portion thereof, a primary refrigerating system having evaporator coils associated with said sharp-freezing compartment for cooling the latter, said coils being in heat-absorbing relation also with the lower portion of said main compartment to form within the latter an ice-freezing area, and a secondary refrigerating system in heat exchange relation with the primary system and including evaporator coils bonded to the said inner liner for refrigerating said food storage area.

12. In a refrigerator of the character described, a cabinet having therein a main compartment forming a food storage area, an inner metallic liner in said cabinet forming the walls of said compartment, a sharp-freezing compartment located below said main compartment, said sharp-freezing compartment being enclosed at the sides and bottom thereof and having an access opening in the upper portion thereof, a primary refrigerating system having evaporator coils associated with said sharp-freezing compartment for cooling the latter, said coils being in heat-absorbing relation also with the lower portion of said main compartment to form within the latter an ice-freezing area, a secondary refrigerating system in heat exchange relation with the primary system and including evaporator coils bonded to the said inner liner for refrigerating said food storage area, partition means separating the ice-forming area from the said food storage area of said main compartment, and a door on said cabinet constituting a common closure for said areas and compartments.

13. In a refrigerator of the character described, a cabinet having an upper compartment with marginal edges defining a forward access opening, a lower compartment having its sides and bottom enclosed and having an access opening in the upper portion thereof facing forwardly and upwardly, and a door having a main surface portion disposed in a substantially vertical plane to seal the access opening of said upper compartment and having a lower surface portion angularly disposed with respect to said main portion to seal the access opening of said lower compartment.

14. In a refrigerator, a cabinet having a first refrigerated compartment, a second and lower compartment enclosed at sides and bottom and having an access opening in the upper part thereof, a third compartment disposed between said first and second compartments, heat exchange apparatus including means for refrigerating the said second compartment to a temperature materially lower than the normal refrigerated temperature of the first and third compartments, and for refrigerating said third compartment to a temperature materially lower than the normal refrigerated temperature of the first compartment, and a door constituting a common closure for said compartments.

15. In a refrigerator, a cabinet having a first refrigerated compartment, a second and lower compartment enclosed at sides and bottom and having an access opening in the upper part thereof, heat exchange apparatus including means for refrigerating the said second compartment to a temperature materially lower than the normal refrigerated temperature of the first compartment, a door constituting a common closure for said compartments, and means cooperative with said door when the latter is closed for isolating the compartments from each other.

16. In a refrigerator of the character described, a sharp-freezing compartment, a freezing compartment adjacent said sharp-freezing compartment, a relatively high temperature main compartment located above the sharp-freezing and freezing compartments, said sharp-freezing compartment being enclosed at the sides and bottom and having an access opening in the upper portion thereof, and refrigerating apparatus including evaporator elements respectively in heat-absorbing relation with said compartments and operative differentially to maintain the compartments at their respective refrigerating temperature.

17. In a refrigerator of the character described, a moist-cold compartment, a freezing compartment, a sharp-freezing compartment located below the moist-cold and the freezing compartments, said sharp-freezing compartment being enclosed at the sides and bottom and having an access opening in the upper portion thereof, and refrigerating apparatus including evaporator elements respectively in heat-absorbing relation with said compartments and operative differentially to maintain the compartments at their respective refrigerating temperatures.

18. In a refrigerator of the character described, a wall structure defining upper, lower and intermediate compartments, said lower compartment being enclosed at the sides and bottom and having an access opening in the upper portion thereof, and refrigerating apparatus including heat-absorbing units carried respectively by the upper, lower intermediate compartment-defining walls and operative differentially to cool said lower compartment to a sub-freezing temperature, said intermediate compartment at freezing temperature and said upper compartment to a relatively elevated non-freezing temperature.

DONALD E. DAILEY.

REFERENCES CITED

The following references are of record in the file of this patent:

UNITED STATES PATENTS

| Number | Name | Date |
|---|---|---|
| 1,758,073 | Davenport | May 13, 1930 |
| 2,112,980 | Berry | Apr. 5, 1938 |
| 2,166,506 | Phillip | July 18, 1939 |